(12) United States Patent
Haley et al.

(10) Patent No.: US 8,919,610 B2
(45) Date of Patent: Dec. 30, 2014

(54) VACUUM BOTTLE STOPPER FOR WINE AND METHOD

(71) Applicant: Vinum Corporation, Oak Brook, IL (US)

(72) Inventors: Jean E. Haley, Oak Brook, IL (US); James D. Ryndak, Barrington Hills, IL (US); Roger M. Masson, Oak Park, IL (US)

(73) Assignee: Vinum Corporation, Oak Brook, IL (US)

(*) Notice: Subject to any disclaimer, the term of this patent is extended or adjusted under 35 U.S.C. 154(b) by 48 days.

(21) Appl. No.: 13/840,344

(22) Filed: Mar. 15, 2013

(65) Prior Publication Data

US 2014/0263453 A1    Sep. 18, 2014

(51) Int. Cl.
| | | |
|---|---|---|
| *B67D 1/08* | (2006.01) | |
| *B65D 39/00* | (2006.01) | |
| *B65B 31/04* | (2006.01) | |

(52) U.S. Cl.
CPC ........... *B65D 39/0058* (2013.01); *B65B 31/047* (2013.01); *B65D 39/00* (2013.01)
USPC .............. 222/152; 222/563; 215/355; 141/56

(58) Field of Classification Search
CPC .............. B65D 39/00; B65D 39/0017; B65D 39/0011; B65D 39/007; B65D 39/0076; B65D 39/0882; B65D 39/0088; B65D 39/0023; B65D 39/0052; B65B 31/047; B65B 31/08
USPC .......... 222/152, 563, 554, 566; 215/355, 296; 141/65, 8, 7
See application file for complete search history.

(56) References Cited

U.S. PATENT DOCUMENTS

| | | | |
|---|---|---|---|
| 1,649,530 A | 11/1927 | Holsinger | |
| 1,907,358 A | 5/1933 | Kuehne | |
| 2,065,121 A | 12/1936 | De Laney et al. | |
| 2,128,128 A | 8/1938 | Evans | |
| 3,056,538 A | 10/1962 | Owsen | |
| 3,578,221 A | 5/1971 | Lukesch | |

(Continued)

FOREIGN PATENT DOCUMENTS

FR    2717152    9/1995

OTHER PUBLICATIONS

International Searching Authority, International Search Report and Written Opinion, International Application No. PCT/US2014/029512, Aug. 5, 2014.

*Primary Examiner* — Lien Ngo
(74) *Attorney, Agent, or Firm* — Hinshaw & Culbertson LLP

(57) ABSTRACT

A stopper for wine, a method of preserving wine, and a method of serving wine from a bottle stored in a vacuum are disclosed. The stopper has a vacuum valve in a vacuum indicator in a removable cap. The vacuum valve has a self-closing passageway due to the passageway traversing an elastomeric material. The vacuum indicator moves in response to vacuum and reveals a marking on a valve opener when a desired vacuum is achieved. The stopper may have a filter, which also aerates. The method of preserving wine includes installing the stopper in the neck of the bottle and withdrawing air from the bottle through the stopper. The method of serving wine includes releasing vacuum from the bottle by unseating the removable cap, removing the cap and pouring wine through the stopper. Pumps for the stopper are also disclosed.

21 Claims, 9 Drawing Sheets

(56) References Cited

U.S. PATENT DOCUMENTS

| | | | |
|---|---|---|---|
| 3,976,216 A | 8/1976 | Lambert | |
| 3,977,575 A | 8/1976 | Macquire-Cooper | |
| 4,003,489 A | 1/1977 | Bingaman | |
| 4,019,629 A | 4/1977 | Dubner et al. | |
| 4,280,634 A | 7/1981 | Wiesenberger et al. | |
| 4,410,110 A | 10/1983 | Del Bon et al. | |
| 4,428,478 A | 1/1984 | Hoffman | |
| 4,473,174 A | 9/1984 | Heuser | |
| 4,763,803 A | 8/1988 | Schneider | |
| 4,845,819 A | 7/1989 | Kyomen et al. | |
| 4,911,314 A | 3/1990 | Schneider | |
| 4,942,967 A | 7/1990 | Schneider | |
| 4,989,745 A | 2/1991 | Schneider | |
| 4,998,633 A * | 3/1991 | Schneider | 215/311 |
| 5,031,785 A * | 7/1991 | Lemme | 215/228 |
| 5,465,857 A | 11/1995 | Yang | |
| 5,535,900 A * | 7/1996 | Huang | 215/228 |
| 5,924,338 A | 7/1999 | Peck | |
| 6,874,545 B1 | 4/2005 | Larimer et al. | |
| 6,886,605 B2 * | 5/2005 | Luis | 141/8 |
| 6,976,669 B2 | 12/2005 | Van Zijll Langhout et al. | |
| 7,562,794 B2 | 7/2009 | Van De Braak et al. | |
| 7,611,429 B2 | 11/2009 | O'Neill et al. | |
| 8,123,086 B2 * | 2/2012 | Haley | 222/484 |
| 2006/0102659 A1 | 5/2006 | Marr et al. | |
| 2007/0199615 A1 | 8/2007 | Larimer et al. | |
| 2011/0126939 A1 * | 6/2011 | Luis | 141/65 |
| 2011/0130740 A1 | 6/2011 | Levy | |
| 2011/0220606 A1 * | 9/2011 | Alipour | 215/230 |
| 2013/0153685 A1 | 6/2013 | Michael et al. | |

\* cited by examiner

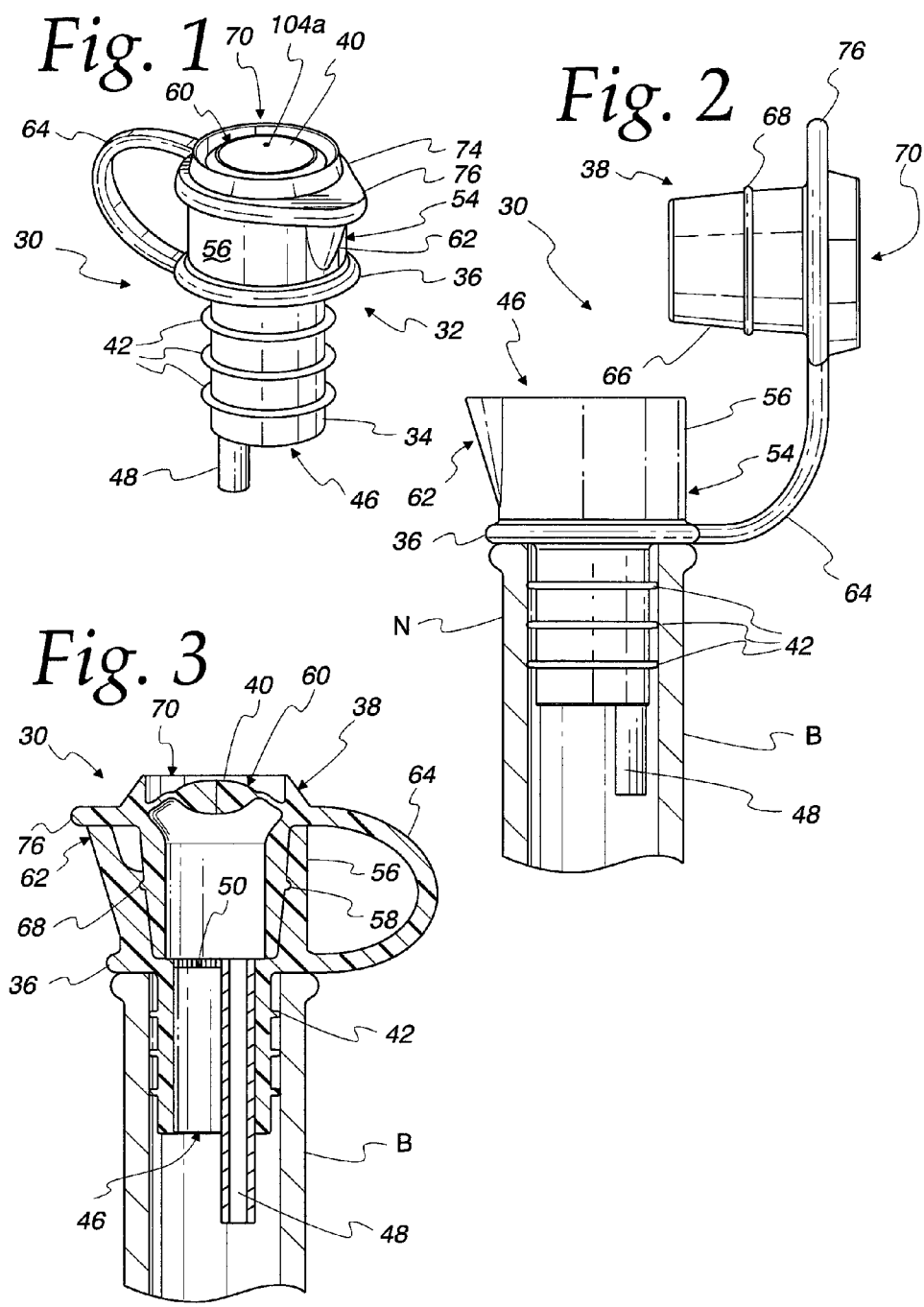

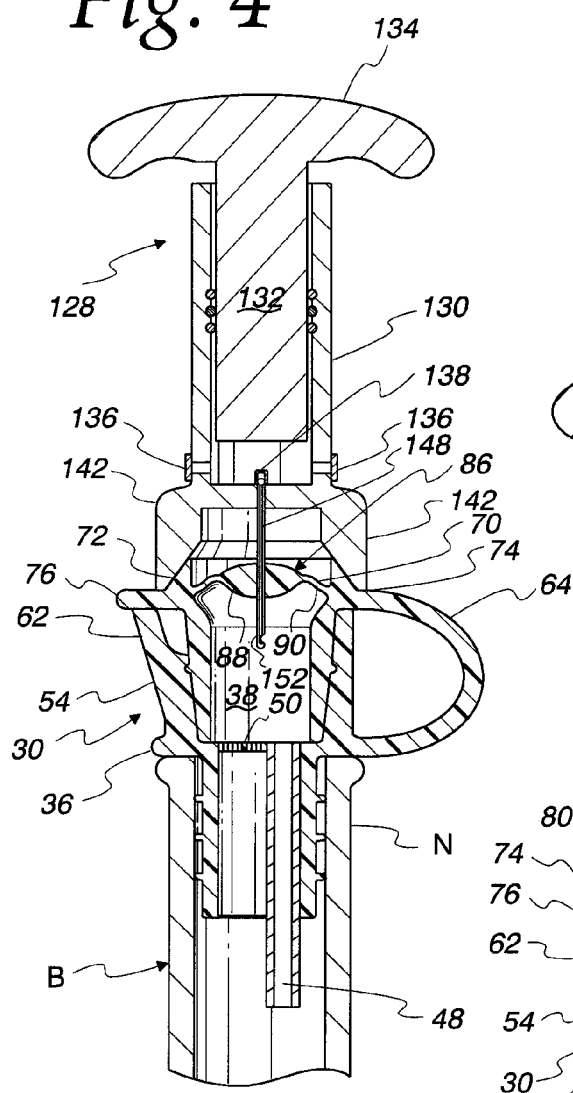
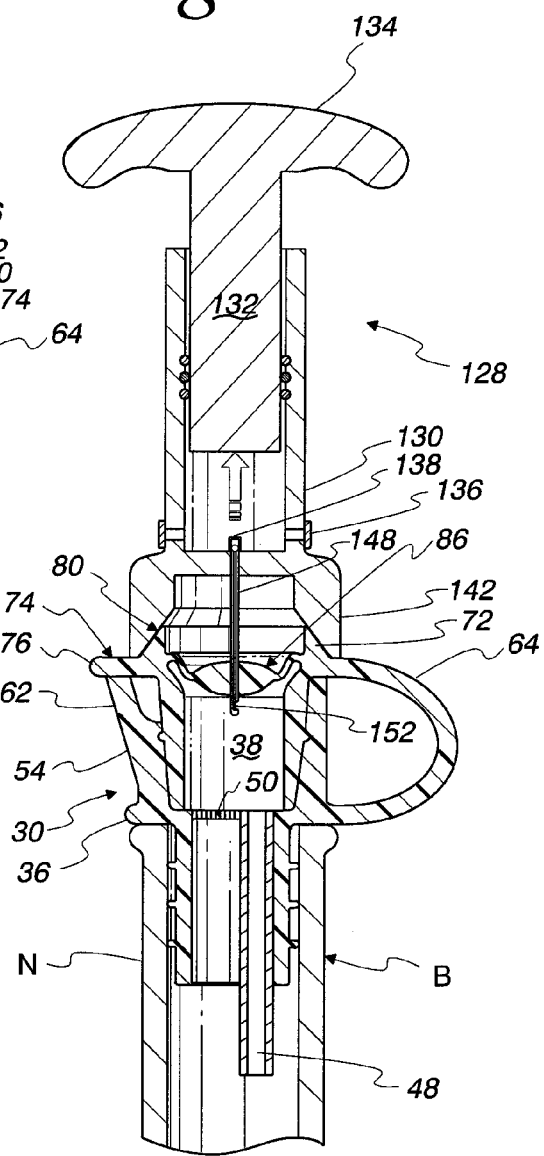
Fig. 4
Fig. 5

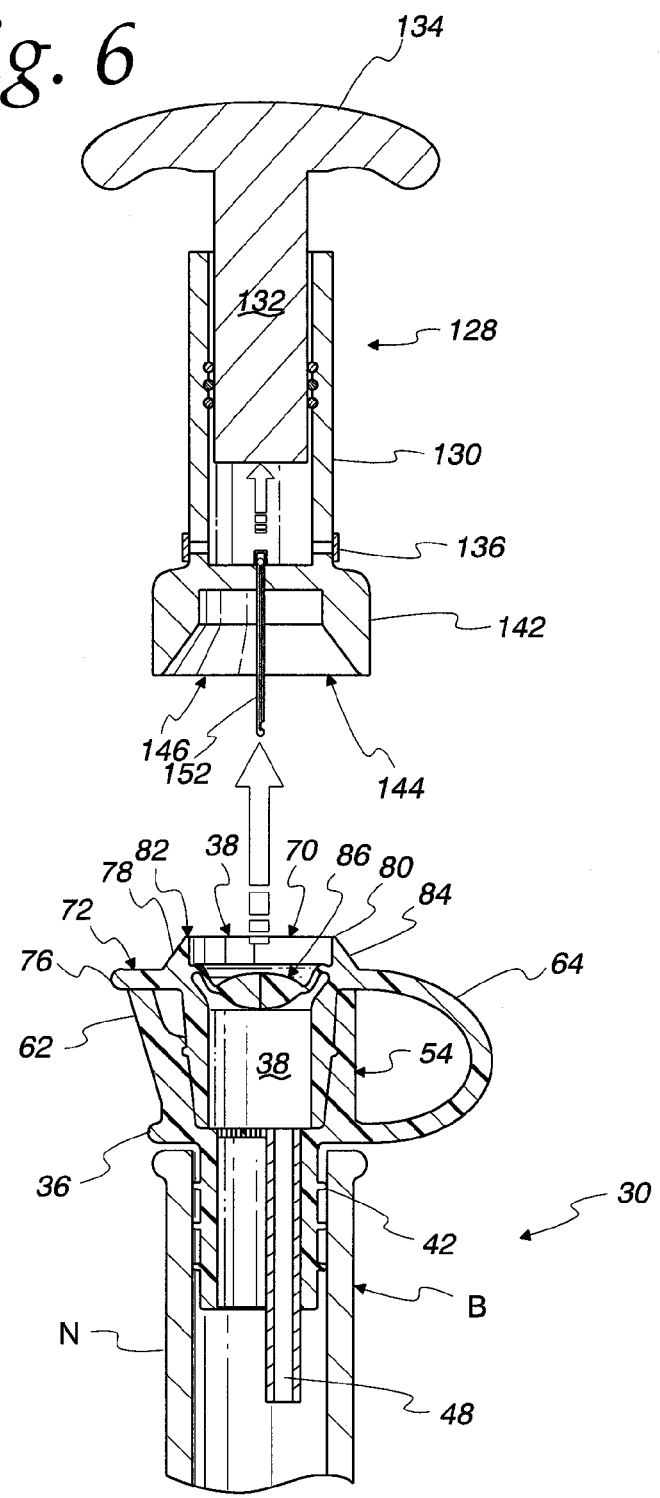

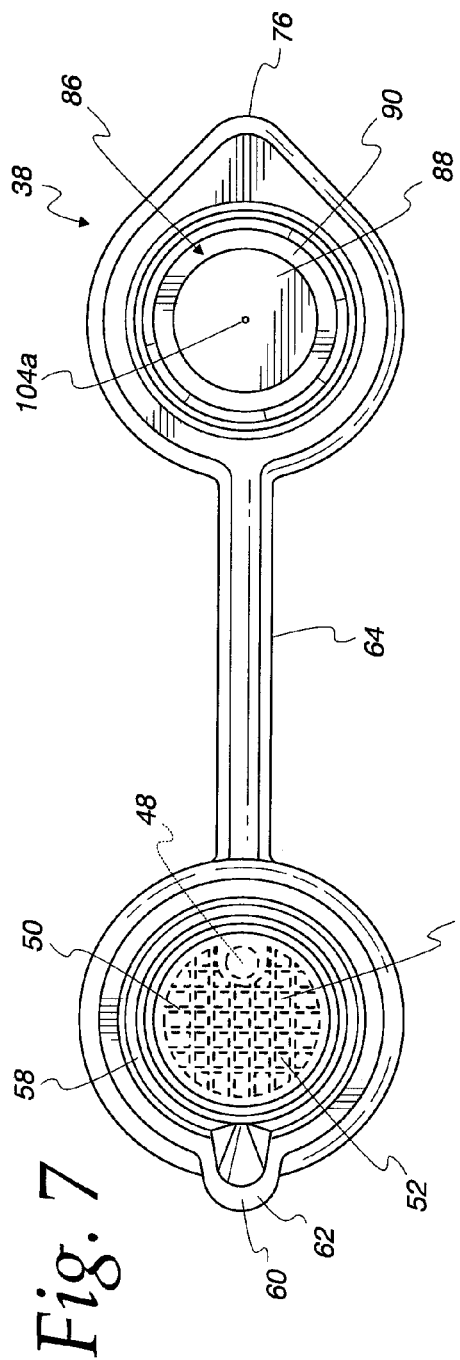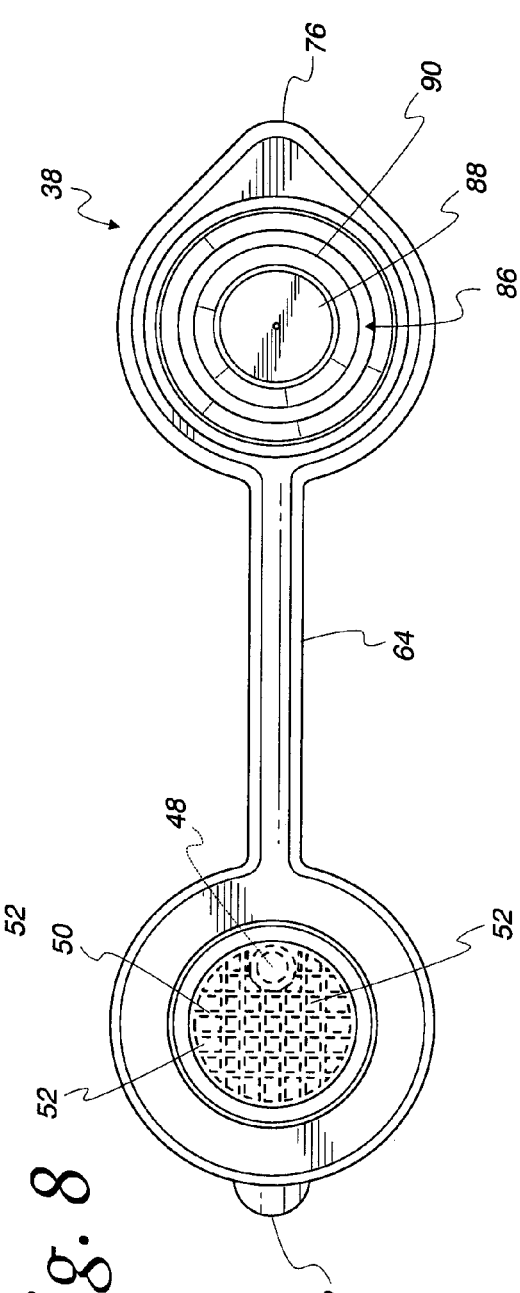

VACUUM BOTTLE STOPPER FOR WINE AND METHOD

FIELD OF THE INVENTION

The present invention relates to a bottle stopper that is particularly suited for wine contained in bottles, a method of preserving wine and a method of serving wine from a bottle stored under vacuum. The bottle stopper permits air evacuation from the empty portion of the bottle and after evacuation the bottle stopper maintains the vacuum over an extended period of time. More particularly, the present invention relates to a bottle stopper for wine having a removable cap, through which a vacuum in the wine bottle can be achieved and maintained over a storage period.

BACKGROUND OF THE INVENTION

Wine, especially vintage wine, is typically bottled in glass bottles as the last phase of the winemaking process. The wine bottle is sealed with an appropriate closure, which may be, for example, a natural or synthetic cork or a screw-top closure. The wine bottle is opened by removing the cork or screw-top closure. When the bottle is opened, air from the external atmosphere enters the bottle. As wine is poured from the bottle for consumption, more air enters the bottle, replacing the wine removed from the bottle.

The introduction of air into the opened wine bottle for a relatively short period of time, such as several hours, for example, is usually not significant. Relatively brief exposure of newly opened wine to oxygen in the air can improve its organoleptic properties. But often, when the entire bottle of wine is not consumed in several hours, for example, but merely closed with the cork, screw-top or other closure member and stored for a period of time, such as overnight, for a day, week or even longer. Storage of a partially consumed bottle of wine in this manner is usually deleterious to the remaining wine. This is because oxygen from the air that has been introduced into the bottle reacts with the wine, adversely affecting the wine's organoleptic properties noticeably over time, sometimes in a day or less. These deleterious effects usually become more noticeable as more time passes before the remainder of the wine is consumed, and can render the wine "undrinkable" by ordinary standards.

A need exists for improved devices and methods for storing partially consumed bottles of wine so that the deleterious effects of oxygen in the bottle can be substantially reduced.

BRIEF SUMMARY OF THE INVENTION

In accordance with the present invention, an improved bottle stopper and methods are provided that are particularly suited for storing wine in bottles that have been previously opened. The inventive bottle stoppers and methods are also particularly suited for pouring wine from a bottle and resealing and storing the unused portion of wine remaining in the bottle for an extended period of time while avoiding or minimizing deleterious effects on the wine because of exposure to oxygen present in the atmosphere.

In accordance with one aspect of the present invention, a bottle stopper for maintaining a vacuum inside a wine bottle is provided. The inventive bottle stopper has a body composed of a neck portion for insertion into the neck of a wine bottle with the neck portion configured for liquid sealing the neck of the bottle and for maintaining a vacuum inside the bottle. The body of the bottle stopper also includes an upper portion configured to extend above the neck portion. A fluid passageway for pouring wine from the bottle extends through the neck portion and the upper portion of the bottle stopper body. A removable cap is adapted or configured to be inserted into the upper portion of the stopper body to form a closed position that closes the stopper and forms a vacuum-maintaining seal between the cap and the upper portion of the bottle stopper body. The removable cap also includes a vacuum valve having a self-closing valve passageway that extends to the fluid passageway of the bottle stopper. The valve passageway is adapted to be opened by mechanical insertion of a valve opener into the passageway. This allows withdrawal of air or whatever gas is contained within the wine bottle to be evacuated to a desired degree. The evacuation can be accomplished by a suitable vacuum pump or other vacuum source, for example. As used herein, the term "vacuum" does not mean an absolute vacuum, that is, a complete absence of any gas, but rather a partial vacuum, as will be understood by those skilled in the art.

In accordance with another aspect of the invention, the vacuum valve may be an integral part of the cap of the bottle stopper. In addition, the entire bottle stopper, including the cap may be formed as an integral unit by any suitable method, including, for example, injection molding. Consequently, bottle stoppers in accordance with the invention can be reliably and efficiently made.

In addition, bottle stoppers in accordance with the present invention can perform multiple functions including, but not limited to, vacuum storage of wine in wine bottles, recorking wine bottles that have been opened, the ability to open the stopper to pour additional wine from the bottle without removing the stopper from the bottle, filtering the wine as it is being poured, pouring the wine smoothly from the bottle and aerating the wine as it is being poured from the bottle.

In accordance with another aspect of the invention, the stopper cap has an aperture extending therethrough and the vacuum valve is disposed in the cap aperture. In one aspect, at least the cap material that surrounds the cap aperture comprises resilient material and the vacuum valve is mounted in the cap aperture in an interference fit relationship to cause the resilient material surrounding the aperture to exert a radial inward force on the vacuum valve body. This has the beneficial effect of urging the valve passageway to a closed position which helps to facilitate maintaining a vacuum inside the wine bottle.

In accordance with another aspect of the invention, the removable cap further includes a brim or a radially outwardly extending portion that extends beyond the upper portion of the stopper body when the cap is inserted into the upper portion of the stopper body to close the stopper. The brim facilitates opening the cap from the closed position and releasing the vacuum inside the wine bottle by allowing atmospheric air to enter the interior of the bottle.

In accordance with another aspect of the invention, the bottle stopper further includes a pour spout located in the upper portion of the bottle stopper body and the brim is configured as a tab extending over the pour spout and preferably past the pour spout to enable a user to push up on the tab to release any vacuum located inside the wine bottle as well as to open the stopper by removing the cap from within the upper portion of the bottle stopper body.

In accordance with another aspect of the invention, a vacuum indicator is provided as part of the bottle stopper. The vacuum indicator may be an integral part of the bottle stopper and in one embodiment is part of the removable cap. The vacuum indicator is capable of indicating that a desired vacuum has been achieved in the bottle when the bottle stopper is in an operative position inside the bottle and the cap is in the closed position. In one aspect of the invention, the vacuum indicator can be located in a top portion of the cap and includes a flexible region in the top of the cap that circumscribes a region that includes the vacuum valve opening and permits the circumscribed region to be deflected relatively inwardly towards the neck portion (and the interior of the bottle) when the stopper is mounted on a bottle and there is a vacuum in the bottle, and the circumscribed region is not relatively deflected inwardly in the absence of a vacuum in the bottle. In one embodiment, the vacuum indicator comprises a relatively thinner portion in the top of the cap that circumscribes the vacuum valve and/or the vacuum valve opening allowing the circumscribed region to be deflected relatively inwardly as previously described in the top of the cap.

In accordance with another aspect of the invention, a vacuum bottle stopper kit is provided. The vacuum bottle stopper kit is composed of a bottle stopper as previously described and a vacuum pump having a mechanical insertion member for opening the vacuum valve. The vacuum valve is used for evacuating the interior of a wine bottle through the valve passageway when the bottle stopper is mounted in the wine bottle and the cap is in the closed position.

The bottle stopper kit may further include a bottle stopper as previously described that includes a vacuum indicator in the cap where the vacuum valve is located in the top portion of the cap and the vacuum indicator comprises a flexible region in the top of the cap that circumscribes a region that includes the vacuum valve opening, which region may have less flexibility than the flexible region, and permits the circumscribed region to be deflected relatively inwardly towards the neck portion when the stopper is mounted on a bottle and there is a vacuum in the bottle and the circumscribed region is not relatively deflected inwardly in the absence of a vacuum in the bottle. The mechanical insertion member may comprise a hollow needle having a marking, the needle insertable into the valve passageway, the marking being disposed within the valve passageway in the absence of a vacuum in the bottle so that it is not visible to the user. The vacuum indicator is movable relative to the hollow needle so that the marking is revealed and observable by a user by movement of the vacuum indicator in the cap inwardly and relative to the hollow needle in response to the vacuum pump forming a vacuum in the bottle.

In accordance with another aspect of the invention, a method of evacuating and storing wine in a wine bottle having an opening is provided. The method includes providing a bottle stopper in accordance with the invention as described above. The method further includes installing the stopper into the opening of a wine bottle and if the cap is not in the closed position placing the cap of the bottle stopper in the closed position. The valve passageway is opened by mechanically inserting a valve opener into the valve passageway and the wine bottle is evacuated to form a vacuum therein by withdrawing air from the interior of the bottle through the valve passageway. The valve opener is then removed or withdrawn from the valve passageway and the self-closing aspect of the valve passageway causes the valve passageway to close, thereby maintaining the vacuum in the bottle. The evacuation of air or other gas from the wine bottle may include drawing air from the wine bottle through the valve opener. One suitable type of valve opener is a hollow needle, for example.

Where the stopper further includes a pump support and wherein opening the valve passageway and the step of opening the valve passageway further includes guiding the pump onto the pump support such that the valve opener is aligned with and enters the valve passageway.

In accordance with another aspect of the method of storing wine in accordance with the invention, the stopper further includes a vacuum indicator in the removable cap and the method further includes depressing or causing the depression of the vacuum indicator by evacuating the bottle. The depressing of the vacuum indicator can be an indication that sufficient vacuum has been achieved by revealing a sufficient vacuum marking that can be located on the valve opener, which may be a hollow needle. After the interior of the wine bottle has been evacuated and the valve passageway is allowed to close by removing the valve opener from the valve passageway, the wine can be stored in the bottle with a vacuum therein for an extended period of time. Typical extended periods of time can be as desired and may be a period of less than an hour or periods of greater than an hour, a day or more, two days or more and any integer number of days or more, for example, including several weeks. The user can inspect the stored bottle of wine and view the vacuum indicator to provide a ready indication that the interior of the wine bottle is still under vacuum. If it appears that the vacuum has been lost or partially lost, the interior of the wine bottle can be re-evacuated using the stopper and methods as previously described.

In accordance with another aspect of the invention, a method of serving wine from a wine bottle having a vacuum in the interior of the wine bottle with an inventive stopper in accordance with the invention located in the opening or neck of the wine bottle is provided. The method includes at least partially removing the removable cap from the upper portion of the bottle stopper to allow air from the atmosphere to enter the interior of the bottle. The method may further include either removing the bottle stopper in its entirety from the bottle or alternatively by merely completely removing the cap from the upper portion of the bottle stopper, and then pouring wine from the bottle into a desired receptacle. The wine thus may be poured through the body of the bottle stopper including through the upper portion.

In accordance with another aspect of the invention, after the vacuum has been removed and wine has been poured from the bottle, if there is still wine remaining in the bottle that is not desired to be used at that time, the wine bottle can be again evacuated to form a vacuum therein by withdrawing sufficient air from the interior of the bottle through the valve passageway as previously described to provide a desired level of vacuum. Thereafter, the valve passageway is closed by removal or withdrawal of the valve opener and then storing for a period of time the wine remaining in the bottle while under vacuum.

BRIEF DESCRIPTION OF THE DRAWINGS

FIG. 1 is a perspective view of a first embodiment of a vacuum bottle stopper in accordance with the invention with the cap inserted into the stopper.

FIG. 2 is an elevation view of the vacuum bottle stopper of FIG. 1 illustrated in the open position in the neck of a cross-sectional view of a wine bottle.

FIG. 3 is a cross-section view of the vacuum bottle stopper of FIG. 1 mounted in the neck of a wine bottle.

FIGS. 4 and 5 are cross-section views of the vacuum bottle stopper of FIG. 1 mounted in the neck of a wine bottle and connected to a matching vacuum pump. In FIG. 4, the dome of the bottle stopper's cap is in the "no-vacuum" position, not depressed. In FIG. 5, the dome of the bottle stopper's cap is in the "vacuum" position, depressed.

FIG. 6 is a cross-section view of the vacuum bottle stopper of FIG. 1 positioned in the neck of a wine bottle with the dome of the stopper's cap depressed.

FIGS. 7 and 8 are top and bottom plan views of the vacuum bottle stopper of FIG. 1.

DETAILED DESCRIPTION OF THE INVENTION

In accordance with the present invention, an improved bottle stopper and methods in accordance with the invention are described in detail in this section, with reference to the accompanying figures. In general, when discussing the location of components of the bottle stopper, the stopper is oriented such that it can be installed or is installed in the neck of a wine bottle that is upright with the bottle opening at the top unless indicated otherwise. The entire disclosure of U.S. Pat. No. 8,123,086 ('086 patent) is hereby expressly incorporated by reference. In one aspect of the present invention, the bottle stoppers of the '086 patent are improved by the presence of elements that permit an evacuation of the interior of a wine bottle to form a vacuum in the bottle. In addition, the bottle stoppers of the present invention are capable of maintaining a vacuum in a wine bottle during a storage period of one day, several days or more, for example. Thus, a vacuum seal is maintained between the bottle and the stopper and between the cap and the stopper.

Thus, in one aspect, the inventive bottle stopper of the present invention may have the same or similar features and may have a similar appearance to devices of the '086 patent, but with the addition of the aforesaid functions.

Figure 19:
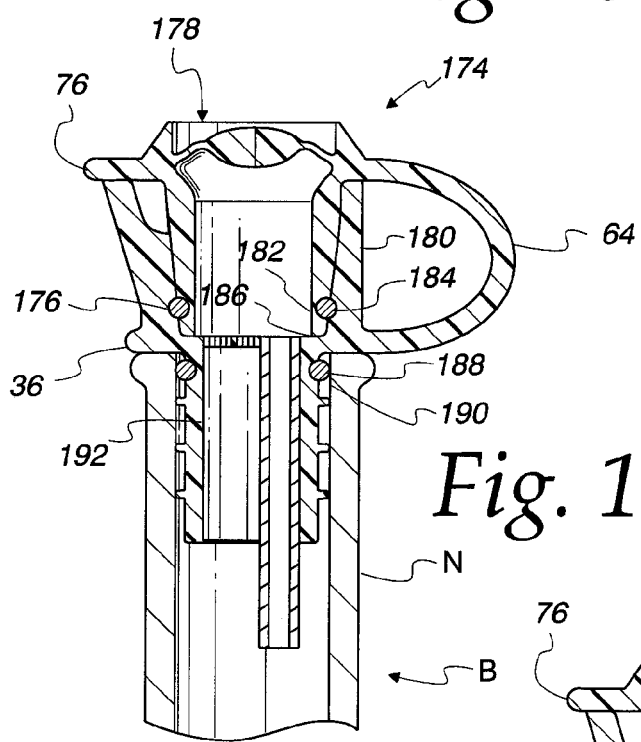
FIG. 19 is a cross-sectional elevation view of another embodiment of the stopper employing o-rings for seals.

Referring to FIGS. 1-8, vacuum bottle stopper 30 represents one embodiment of a vacuum bottle stopper of the present invention. Vacuum bottle stopper 30 has a stopper body portion 32 composed of a neck portion 34, a shoulder portion 36, and a reusable and resealable cap 38, having a vacuum valve 40, along with other components that can optionally be included. Vacuum valve 40 allows the interior of a wine bottle, on which bottle stopper 30 is mounted to be partially evacuated by withdrawal of the air or other gas in the non-liquid part of the contents of the wine bottle using a suitable vacuum pump. This allows the wine to be stored in the partially evacuated bottle. When it is desired to remove wine from the bottle, atmospheric air or other gas is introduced into the bottle through vacuum valve 40 or through some other portion of vacuum bottle stopper 30. Vacuum bottle stopper 30 can be formed as a single integral mass of suitable material or as an assembly of component parts. The various components of vacuum bottle stopper 30 and its methods of operation, as well as other embodiments of the invention are hereafter described in detail. Neck portion 34 is configured for insertion into and to achieve sealing engagement with the open mouth or neck of a wine bottle B. A shoulder portion 36 which prevents stopper 30 from being excessively inserted into wine bottle B and can provide a further vacuum-maintaining seal. Neck portion 34 typically has a plurality of circumferential sealing rings 42, generally 2, 3, 4, 5 or 6, for sealing the interior of the bottle B between the body 34' of neck portion 34 and neck N of the bottle B from outside air infiltration. In addition or in the alternative, neck portion 34 may have one or more o-rings adjacent shoulder portion 36 (as shown in FIG. 19) to promote the airtight sealing of neck N. Neck body 34' of neck portion 34 is preferably substantially cylindrical or substantially frusto-conical with a slight to moderate taper with or without sealing rings 42 to facilitate achieving a good liquid and airtight (vacuum) seal with bottle B. Neck portion 34 has an internal wine passageway 46, preferably substantially cylindrical or substantially frusto-conical, for wine and an air passageway 48 allowing air to enter bottle B during pouring therefrom. Preferably stopper 30 is designed so that wine passageway 46 is substantially coaxial with neck N of bottle B when inserted into a wine bottle while air passageway 48 is located on the side of wine passageway 46 as shown in FIGS. 7 and 8, for example. Air passageway 48 extends downwardly of wine passageway 46 and preferably down to a shoulder portion of the wine bottle B when the stopper is fully inserted into neck N in its operative position.

Air passageway 48 extends upwardly to or beyond a filter 50. Filter 50 has a plurality of regularly spaced, filter apertures 52 in an array. Filter apertures may be square, round, oval or rectangular as desired. Filter apertures are sized to retain precipitates in wine while allowing the wine to pass through easily. The dimension of aperture 52 is preferably about 0.04 inches or less (dimension of side in the apertures shown). Filter 50 may be located within neck portion 34 or within an upper portion 54 of stopper 30 or at the transition of neck to upper portion 54. Preferably, filter 50 is located within upper portion 54 substantially level with shoulder portion 36.

Wine passageway 46 extends through upper portion 54. Upper portion 54 may be any appropriate shape such as, for example, circular, triangular, square, hexagonal or irregular cross-sectional shapes. Generally, upper portion 54 is wider than neck portion 34. Upper portion 54 has a sidewall or sidewalls 56, a sealing groove 58 and visual indicator 60 that signals the user which side of the stopper to pour from (preferably air passageway 48 is on top during pouring), in this embodiment comprising a spout 62. Typically and as shown, visual indicator 60 is substantially diametrically opposed from air passageway 48. Visual indicator 60 may alternatively comprise a protuberance or other marking to indicate a preferred orientation of wine bottle B during pouring. In particular, during pouring, wine bottle B is tipped such that visual indicator 60 is oriented downwardly and air passageway 48 upwardly so that air rather than wine passes into the bottle through air passageway 48. This orientation provides a smooth pour and aeration of the wine being poured.

The construction, functions and operation of cap 38 is now described. Preferably, and as illustrated, cap 38 is attached by any suitable structure to stopper 30 to prevent the stopper from being misplaced. Cap 38 may be attached by a strand 64 or one or more strands, a chain, a wire hook arrangement, or any other suitable structure. Preferably strand 64 is attached to shoulder portion 36 diametrically opposed to visual indicator 60 so that cap 38 does not interfere with wine pouring. Cap 38 has an insertion body 66 preferably allowing mating insertion into and sealing of wine passageway 46 of upper portion 54. Insertion body 66 has the same or essentially the same or slightly larger (for a tighter fit and a better seal)

cross-sectional shape as wine passageway 46 and may be slightly conical as shown in FIG. 2 for a tighter fit. Cap 38 also has a sealing ring 68 which in combination with sealing groove 58 provides a seal when cap 38 is seated in wine passageway 46. Alternatively, cap 38 may have a sealing groove and upper portion 54 has a sealing groove. It is to be understood that sealing ring 68 may be integral to cap 38 (or upper portion 54) or may be present as separate (not integral) o-ring. Alternatively or in addition, upper portion 54 may have an o-ring, which may be supported by filter 50, which o-ring is compressed by cap 38 providing a further seal when cap 38 is seated in wine passageway 46.

As shown in FIGS. 4 and 5, cap 38 also has a top 70 that can include a pump base support 72 comprising circumferential brim 74. Alternatively, pump base support 72 may comprise shoulder portion 36 or another shoulder not shown, or a vacuum pump can be remotely connected to vacuum valve 40 by a flexible hose, for example. Brim 74 may be in the shape of a ring with an outwardly extending tab 76 for covering spout 62 and for facilitating the removal of cap 38 from wine passageway 46. Upper portion 54 extends between shoulder portion 36 and brim 74 preferably more than about 0.25 inches (6 mm) and more preferably more than about 0.5 inches (12 mm) so that a thumb can easily engage and push up on brim 74 and more particularly tab 76 to unseat cap 38 releasing vacuum in bottle B and to open stopper 30 by removing cap 38 from upper portion 54. Spout 62 preferably provides a passageway for air to enter bottle B to release vacuum as cap 38 is removed. Preferably strand 64 is attached to brim 74 diametrically opposed to tab 76.

Figure 13:
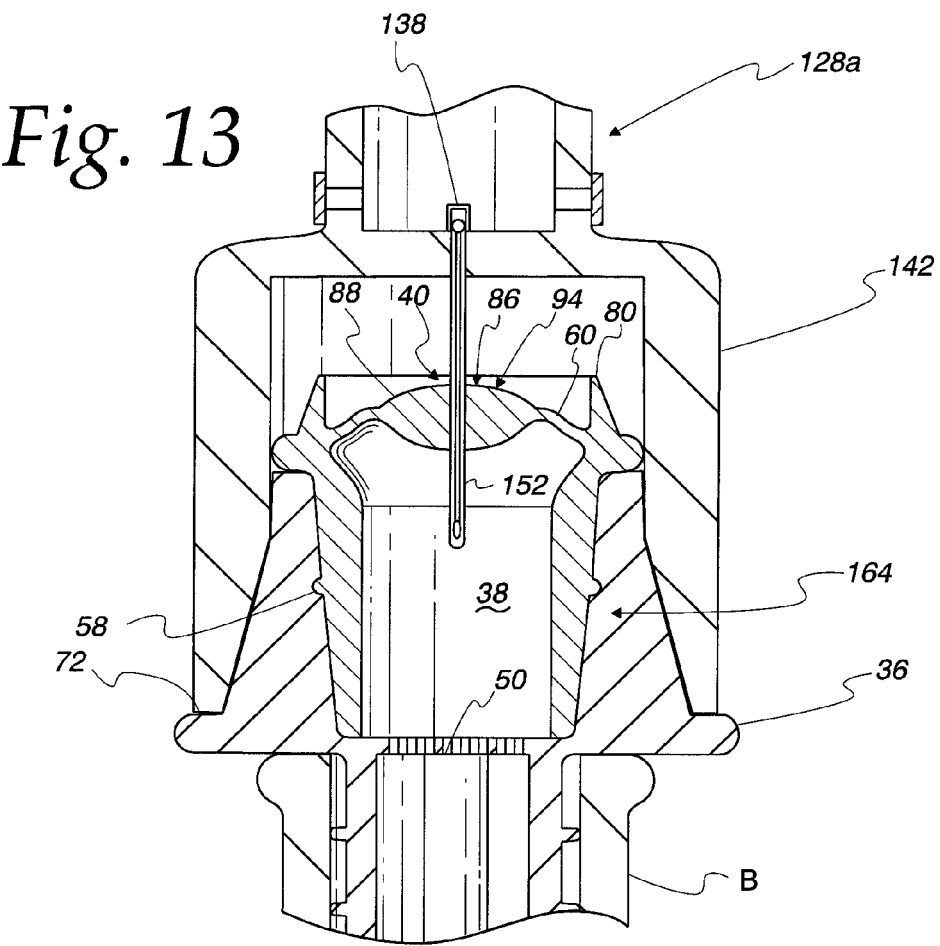
FIG. 13 is a cross-sectional view of the vacuum bottle stopper of FIG. 1 having a vacuum pump with a recessed needle inserted into the bottle stopper.

Stopper 30 may also have a pump locating guide 78, which as illustrated in FIGS. 4-6 comprises raised ridge 80 on cap 38. Alternatively, pump locating guide 78 may comprise brim 74 when pump support 72 comprises shoulder portion 36 as illustrated in FIG. 13. Ridge 80 may have a circular, triangular, square or hexagonal shape, preferably matching the shape of horizontal cross-section of upper portion 54. Ridge 80, as illustrated in FIGS. 4 and 5, has a profile 82 with a slope 84 on the exterior side and is substantially vertical on the interior side. Alternatively or in addition to slope 84, profile 82 may have a slope on the interior side. Slope 84 is helpful in locating and securing a matching pump on top 70 of cap 38 during evacuation pumping of the interior of a wine bottle. It is to be understood that a pump locating guide could be provided that is the inverse of the one described, i.e., a depressed area instead of a raised area or ridge 80.

Cap 38 may have and as illustrated in FIGS. 4-13 and 16-17, does have a visual vacuum indicator 86. Vacuum indicator 86 has an inner portion 88 and an outer portion 90. Ridge 80 may surround indicator 86, but it could also be located partially on inner portion 88. Inner portion 88 has a vacuum valve 40 and is preferably substantially circular. Outer portion 90 is preferably substantially annular. Indicator 86 has two or more positions or states. In a normal position or state 94 when bottle B is not under vacuum, indicator 86 is not depressed and may be configured to have the appearance of a dome. In a vacuum-indicating position or state 96, indicator 86 has been depressed or pulled inwardly by the vacuum, indicating that a partial or sufficient vacuum is in bottle B to properly preserve the wine. Advantageously, vacuum-indicating state 96 can be readily observed by a wine consumer during pumping and during storage. Preferably, indicator 86 achieves the vacuum-indicating or depressed state 96 at a vacuum of greater than about 8 psig (an actual pressure inside the wine bottle of about 6.7 psi (pounds per square inch), preferably greater than about 9 psig, more preferably greater than about 10 psig, and most preferably greater than about 11 psig (an actual bottle pressure of about 3.7 psi). Indicator 86 may have additional states responsive to the vacuum level in bottle B. Outer portion 90 is flexible so that indicator 86 can achieve depressed state 96 in response to achievement of the desired vacuum in the bottle. Preferably, inner portion 88 is relatively inflexible so as to maintain a proper seal for the vacuum valve. Outer portion 90 may be thicker than inner portion 88 to achieve the desired relative inflexibility. Outer portion 90 in addition or in the alternative may include a more resilient material than inner portion 88 such as a suitable non-elastomeric plastic or a suitable metal, preferably food-grade.

As previously briefly described, cap 38 has valve 40 in top 70. Valve 40 is surrounded by ridge 80. Typically, valve 40 is located so that it is substantially coaxial with neck N of bottle B and indicator 86 when stopper 30 is in operative position in bottle B. Valve 40 is preferably self-sealing for permitting a vacuum pump 128 to draw a vacuum in the wine bottle B and for maintaining the vacuum in bottle B when vacuum pump 128 is withdrawn.

Figure 9:
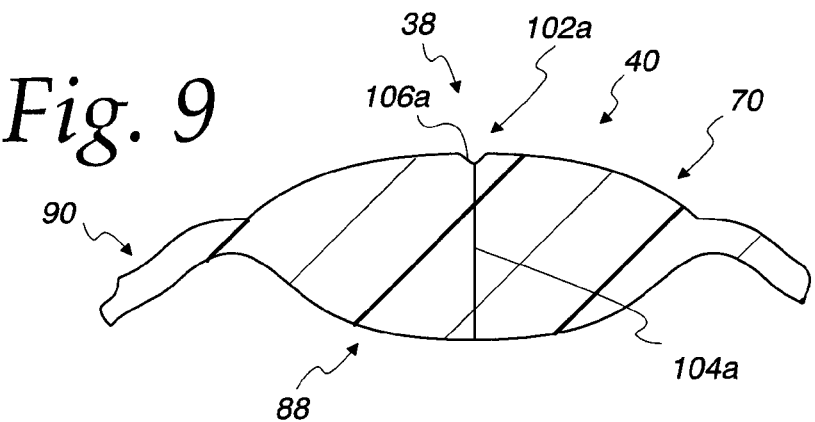
FIGS. 9-12 are enlarged cross-sectional fragmentary views of various vacuum valves that can integrally form part of the vacuum bottle stopper in accordance with the present invention.
Figure 10:
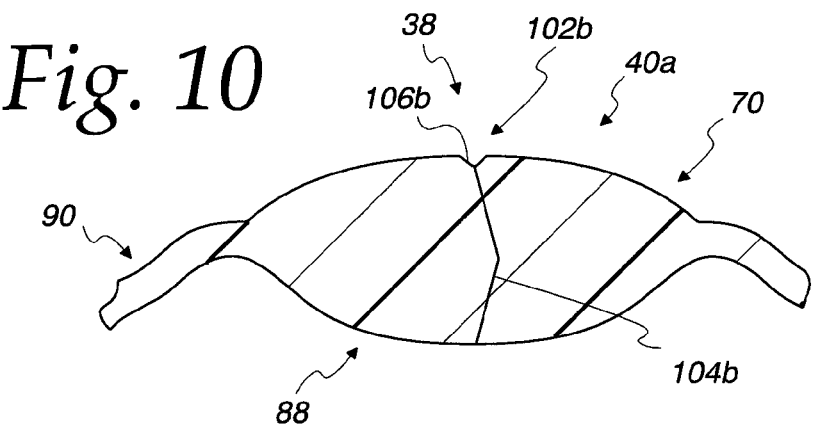
Figure 11:
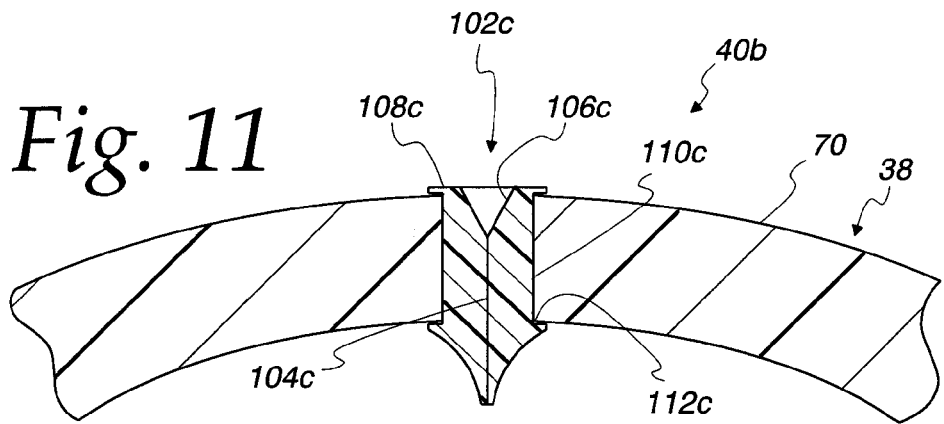
Figure 12:
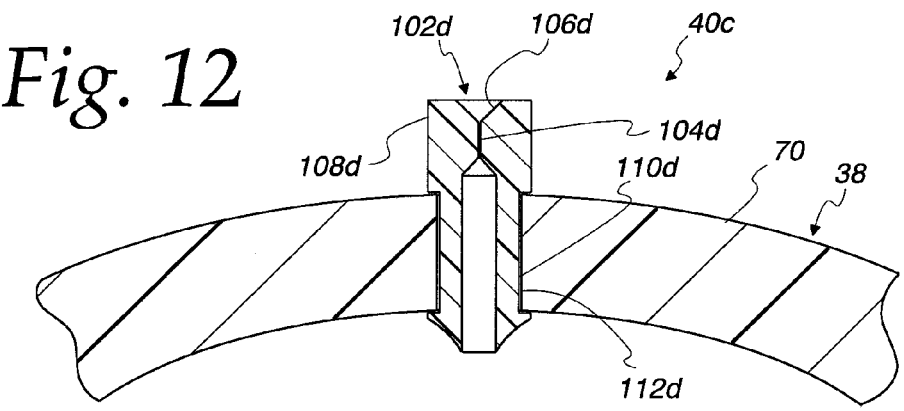

Valve 40 is shown in FIG. 9 and as a substitute any of valves 40a, 40b, 40c, and 40d as illustrated in FIGS. 10-12 may be used. Stopper 30 is illustrated in FIGS. 1-8 with valve 40. Valves 40, 40a, 40b, 40c, have an opening 102a, 102b, 102c, 102d, respectively, connected to valve passageway 104a, 104b, 104c, and 104d, respectively. Openings 102a, 102b, 102c and 102d preferably have a tapering section 106a, 106b, 106c and 106d, respectively. Preferably, sections 106a, 106b, 106c and 106d are substantially conical. Passageways 104a, 104b, 104c, and 104d are self-sealing so that stopper 30 can hold a vacuum without a manual valve closing.

As shown in FIGS. 9-12 and 14, valves 40, 40a, 40d, and 40e are integral to stopper 30 as shown in FIGS. 9 and 10. Valves 40b and 40c are not integral to stopper 30 as shown in FIGS. 11 and 12. Valves 40b and 40c may be a sports ball inflation valve, for example, such as those used on footballs and basketballs, or variations thereof, and have valve bodies 108c and 108d which are installed into openings 110c and 110d, respectively, in top 70 of cap 38. Valve bodies 108c and 108d have recesses 112c and 112d, respectively, so that they can be tightly seated in an interference fit and/or with adhesive in opening 110c and 110d, respectively, thereby promoting maintenance of a vacuum seal. In that regard, cap 38 or at least the portion having openings 110c and 110d and surrounding valves 40b and 40c is made of a resilient material so that a radial inward force is exerted on valve bodies 108c and 108d to help maintain a vacuum seal therebetween and on valve passageways 104c and 104d, to help maintain those valves closed in a vacuum-maintaining position. Valve passageways 104 are long enough to provide a good seal to maintain the desired vacuum in the bottle.

The valves for use in the present invention may be made by any suitable method, including injection molding. The valve passageway in such valves may be made as part of the injection molding process or the passageway can be formed subsequently, such as by insertion of a thin needle or other suitable tool. The material of all or the valve portion and valve indicator portion of the bottle stopper cap may be formed of a food grade resilient material. In the production process, the material of the cap or that portion advantageously may be made so that the material exerts a resilient force directed radially inwardly towards the valve passageway and preferably generally in a direction normal to the length or longitudinal axis of the passageway. Such an arrangement helps maintain a vacuum in the bottle over an extended period by reducing or avoiding air infiltration from the atmosphere into the bottle. Similarly, the cap and upper stopper body may be dimensioned so that a slight interference fit between the cap and the stopper body is achieved (i.e., by making the outer cap diameter slightly larger than the interior passageway of the upper portion of the stopper) to facilitate forming a vacuum and liquid resistant seal therebetween to prevent air infiltration with the bottle and to prevent liquid from leaking out of the bottle.

A potential advantage of valve 40b and 40c is that the length of passageway 104c and 104d is not limited by the thickness of top 70 and more specifically the thickness of inner portion 88 where valve 40b is preferably installed. However, the thickness of inner portion 88 adjacent valves 40, 40a, and 40d may be greater than the thickness elsewhere in inner portion 88 affording longer passageways 104a and 104b, and consequently, a better seal. Passageways 104 may be straight as shown in FIGS. 9, 11, 12 and 14 or non-straight, e.g., crooked, as shown in FIG. 10, which exaggerates the crookedness for ease of viewing. An advantage or distinction of valve 40c is that it has a higher tapering section 106d than valve 40b such that valve 40c is raised relative to top 70. More particularly, section 106d and passageway 104d can be above pump base support 72. This could have the advantage of allowing parts of the vacuum pump to be recessed as will be discussed later. Integral valves 40 and 40a may be raised by having them integrated into a raised portion which is raised relative to top 70 and inner portion 88 and which is preferably located within inner portion 88. Alternatively, top 70 or portions of top 70 can be raised relative to brim 74 so that components of the vacuum pump are recessed and pump locating guide 78 would comprise the side or sides connecting brim 74 to raised top 70 or raised portion of top 70. Alternatively, rather than pump support 72 comprising brim 74, pump support 72 can comprise shoulder portion 36, or another shoulder (not shown), as shown in FIG. 13 and pump guide 78 can comprise sidewall 56 of upper portion 54.

Figure 14:
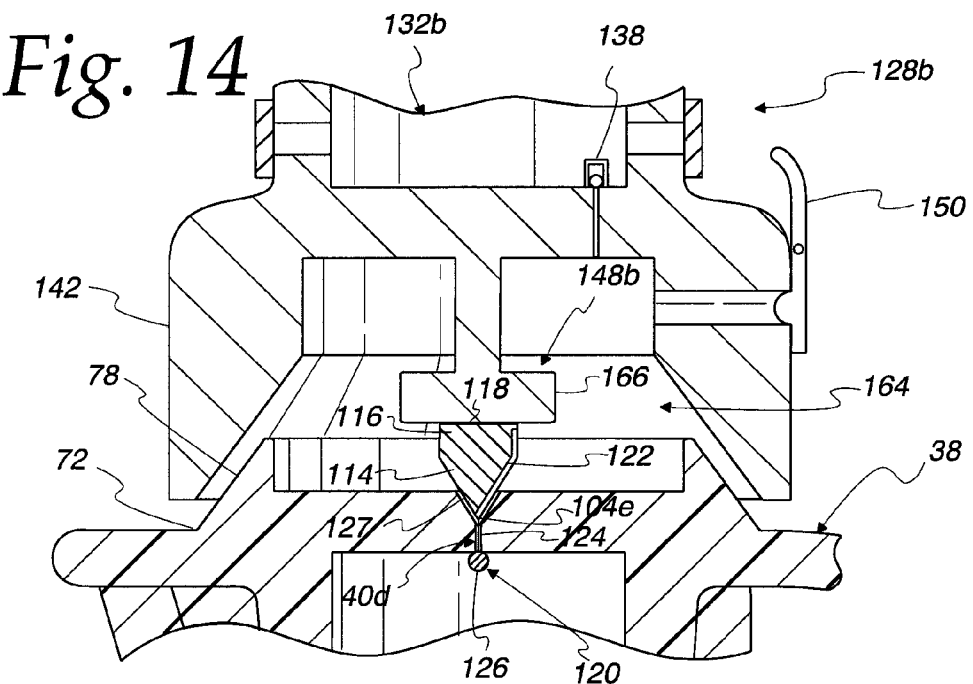
FIGS. 14 and 15 are enlarged cross-sectional views of alternate embodiment valve openers and a vacuum bottle stopper in accordance with the invention.

Valve 40e, illustrated in FIG. 14, has a valve opener 114 installed inside section 106d and passageway 104d. Valve opener 114 has a body 116, top 118 and retention device 120. Body 116 is preferably substantially conical or has a shape matching section 106d except for vertically-extending recess 122. Recess 122 may have a substantially rectangular profile as shown or a curved profile which can be substantially a semi-circle or a semi-oval. Top 118 may be in the form of a dome or as desired. Retention device 120 has a rod 124 and a bottom portion 126. Rod 124 has a length longer than valve passageway 104e and a width wider than the natural (unstretched) width of valve passageway 104d so that a seal is formed around rod 124. Bottom portion 126 has a width sized so that valve opener 114 is retained within valve 40d. Valve opener 114 is wider than rod 124. Bottom portion 127 of valve opener 114 may taper at its very bottom to facilitate insertion of valve opener 114 into valve 40e. Valve 40e and valve opener 114 may be made of any suitable material including a food-grade metal or plastic and preferably one that facilitates movement of valve opener 114 relative to valve 40e, for example, a non-elastomer fluorinated plastic like Teflon®, for example.

As shown in FIGS. 4-6, vacuum bottle stopper 30 and vacuum pump 128 are configured to work together. Vacuum pump 128 is preferably of the manual, piston kind. Pump 128 as illustrated in FIGS. 4-6 has a body 130. Body 130 contains a piston 132 and piston handle 134 for grasping by the hand of a user. Pump 128 also has an exhaust valve 136 for exhausting air withdrawn from bottle B during a pump downstroke and a valve 138 for preventing air from being pushed back into bottle B during the downstroke. Valve 138 is within passageway 140. Pump 128 has a base 142 that is configured to mate on top of pump support 72 during evacuation of bottle B. Base 142 has a cavity 144 and shape 146 matching the shape of pump guide 78 such that guide 78 guides pump 128 onto pump support 72 and supports and secures pump 128 during pumping. Base 142 may be made of a clear material while pump body 130 may be made of an opaque material. A clear material would allow a user to observe vacuum indicator 86 even while vacuum pumping. Pump 128 also has a valve opening mechanism 148.

Vacuum pump 128 may have optional components. It may have a vacuum release 150 for releasing vacuum from bottle B. Vacuum release 150 may be manually actuated or automatically when there is excessive vacuum in the pump 128 and bottle B Pump 128 may have a vacuum indicator, visual, audible or both, for indicating whether a desired vacuum has been achieved. Release 150 may make an audible noise when it opens automatically indicating that sufficient vacuum has been achieved. More generally, vacuum release 150 may comprise an audible vacuum indicator or a visual vacuum indicator that is actuated by the automatic actuation of vacuum release 150.

Figure 16:
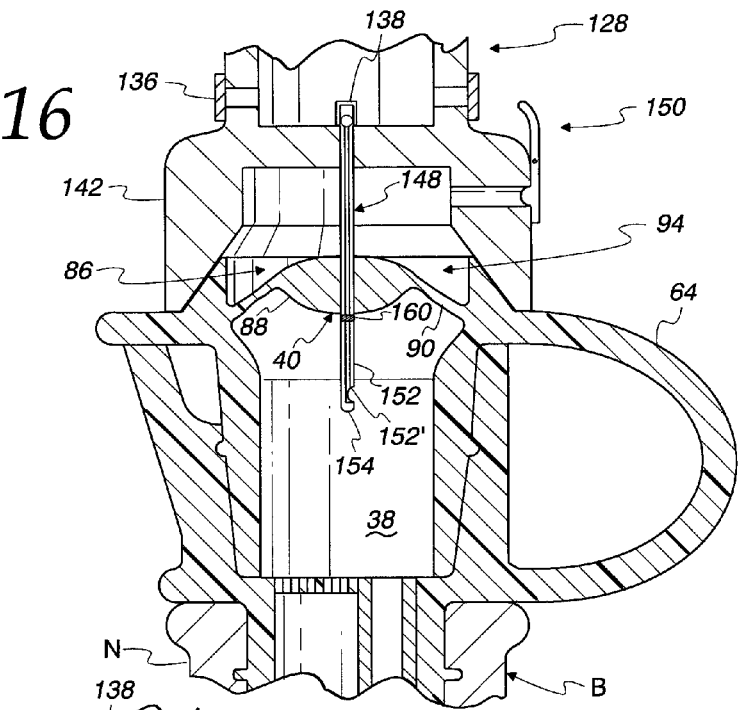
FIGS. 16 and 17 are enlarged sectional views corresponding to FIGS. 4 and 5, respectively, illustrating a needle having a marking for indicating the vacuum level in a bottle.
Figure 17:
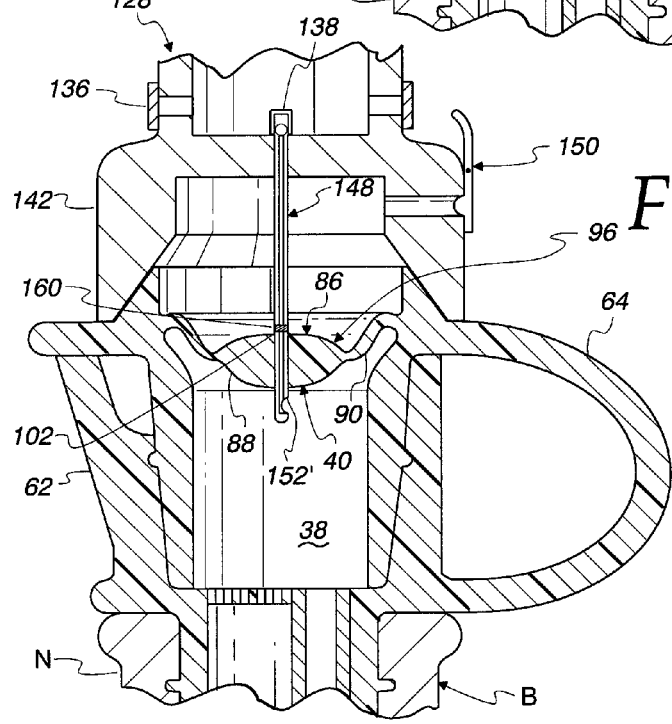

Vacuum pump 128 has different embodiments depending in part upon the valve used in stopper 30. As illustrated in FIGS. 4-6, a vacuum pump 128 has a hollow needle 152 for use with valves 40, 40a, 40b and 40c. Valve opening mechanism 148 comprises needle 152. Needle 152 has a tip 154 which, when inserted into valves 40, 40a, 40b and 40c, is guided into valve passageway 104a, 104b, 104c, 104d by tapering section 106. Needle 152 is hollow and has sufficient length that it extends through valve passageway 104a-d, when vacuum indicator 86 is in its normal state 94. Needle 152 has an interior passageway 152' for connecting the interior of bottle B to piston 132. Needle 152 has a base 158, preferably threaded for attachment and removal to pump 128. Needle 152 may be a sports ball needle. Needle 152 may have one or more gauge markings 160 as shown in FIGS. 16 and 17. Markings 160 may be in the forms of bands of colors, lines, and other indicia for indicating the vacuum level in bottle B. In its simplest embodiment, needle 152 may have a single marking 160; when valve opening 102 is above marking 160 (e.g., when vacuum indicator 86 is in normal state 94) as illustrated in FIG. 16, insufficient vacuum has been achieved for storage. Marking 160 becomes apparent (is above valve opening 102) when vacuum indicator 86 is in depressed state 96 indicating that sufficient vacuum has been achieved for storage as illustrated in FIG. 17. As shown in FIGS. 16 and 17, needle 152 may have additional markings 160 to indicate, for example, that some but insufficient vacuum has been achieved or that excessive vacuum may have been achieved.

Needle 152 may be principally made of any suitable metal such as food grade stainless steel. Needle 152 may have a slippery or non-stick coating or material for contact with valve passageway 104 to facilitate movement of vacuum indicator 86 in response to different vacuum levels. The non-stick coating or material may comprise a suitable fluorinated polymer such as Teflon®, for example.

Referring to FIGS. 4-6, one advantage of pump 128 is that base 142 need not form a seal with stopper 30 as there is a seal formed between needle 152 and valve passageway 104. Consequently, a variation of pump 128, pump 128a illustrated in FIG. 13, has a first slit (not shown) for accommodating strand 64 and a second slit (not shown) for accommodating tab 76 because pump support 72 comprises shoulder portion 36. Preferably, needle 152 is completely recessed within cavity 164. Having needle 152 fully recessed is advantageous because needle 152 is protected from being accidentally bent, permits pump 128a to be stored on its base 142, and protects users from being accidentally poked by needle 152, although it has a blunt, not a sharp tip.

Pump 128b (illustrated in FIG. 14) has a pusher 166 in cavity 164 for pushing valve opener 114 of valve 40d into valve passageway 104e. Valve opening mechanism 148b comprises pusher 166. When pusher 166 pushes onto opener 114, opener 114 opens valve 40d by body 116 pushing into valve passageway 104e and forming passage through recess 122. Passageway 104e then fluidly connects piston/cylinder 132b and cavity 164 to the inside of bottle B. Pump 128b forms a seal with pump guide 78 or pump support 72.

When the desired vacuum is achieved and the pump is withdrawn, indicator 86 when present is in depressed state 96 and vacuum forces exerted on valve 40d push opener 114 up closing passageway 104e.

Figure 15:
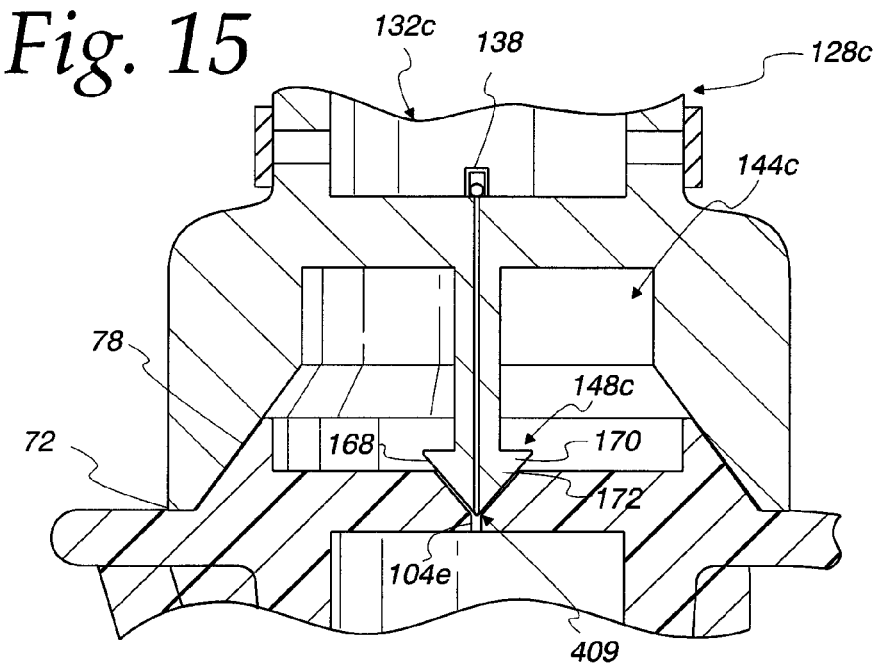

Vacuum pump 128c (FIG. 15) has a suitable valve opening mechanism which may be a needle or other mechanical element for opening valves 40, 40a, 40b, and 40d. Valve opening mechanism 148c has a wedge 168 having a body 170 and vertically extending recess 172. Body 170 of wedge 168 is preferably substantially conical or has a shape matching tapering section 106 except for vertically-extending recess 172. Recess 172 may have a substantially rectangular profile or a curved profile which can be substantially a semi-circle or a semi-oval. Wedge 168 opens valve 40d by body 170 pushing into valve passageway 104e (without retention device 120) and forming a passage through recess 172. Passageway 140c then fluidly connects piston 132c and cavity 144c to the inside of bottle B. Vacuum pump 128c forms a seal with pump guide 78 or pump support 72 of the bottle stopper. When the desired vacuum is achieved and the vacuum pump is withdrawn, indicator 86 is in depressed state 96, indicating a vacuum in the bottle.

Vacuum pump 128 and one or more matching stoppers 30 may be sold as a kit.

Stoppers in accordance with the invention can be formed by any suitable method. Injection molding is one particularly suitable method and permits the various elements of the stopper, including the filter to be integrally formed with the other portions of the stopper, including the cap, attaching strand and valve, except as otherwise indicated. Any suitable material can be used to make a stopper in accordance with the invention. For example, rubber or resins, natural or synthetic, may be used and should be food compatible or food grade. One such resin is Santoprene® resin. Metallic components may be added to the molded stopper for aesthetics or for reinforcement as desired.

Any suitable type of pump can be used to evacuate a stoppered bottle in accordance with the invention. Pumps in accordance with the invention can be made by any suitable method known in the pump art and of any suitable material known in the pump art.

Figure 18:
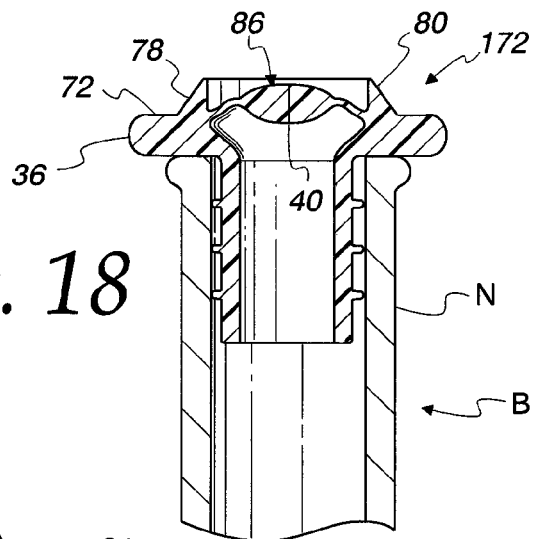
FIG. 18 is a cross-sectional elevation view of another embodiment of the stopper without a removable cap.

FIG. 18 illustrates a vacuum stopper 172. Vacuum stopper 172 lacks a removable cap, filter, and air passageway, but is otherwise the same or similar to vacuum stopper 30. Notably, it has a pump base support 72 comprising a shoulder 36, a pump locating guide 78 comprising raised ridge 80, a vacuum indicator 86, and vacuum valve 40. Stopper 172 can be used to store wine under vacuum. To serve the stored wine, stopper 30 is removed from the bottle. Vacuum stopper 172 has the advantage of being more compact so that it is easier to store a stoppered bottle B in a refrigerator, for example.

FIG. 19 illustrates a vacuum stopper 174. Vacuum stopper 174 uses an o-ring 176 instead of an integral ring 68 to make a seal between removable cap 178 and upper portion 180. Stopper 174 could also have an integral ring 68 for sealing in addition to o-ring 172. Removable cap 178 and upper portion 180 have recesses 182 and 184, respectively, for accepting o-ring 176. Preferably, recess 184 is relatively deeper than recess 182 so that o-ring 176 stays with upper portion 180 when removable cap 178 is removed. O-ring 176 may be located in a floor 186 of upper portion 180. Stopper 174 also has an o-ring 188 located in recess 190 in neck portion 192. O-ring 188 is shown as supplementing integral sealing rings 42 from stopper 30, but may also be used in addition to integral sealing rings 42. O-ring 188 may be located at any suitable location neck portion including, for example, substantially at the junction of the underside of shoulder portion 36 and neck portion 192. Vacuum stopper 174 has the advantage of having o-rings 176 and 188, which may be replaced if they no longer seal properly.

Figure 20:
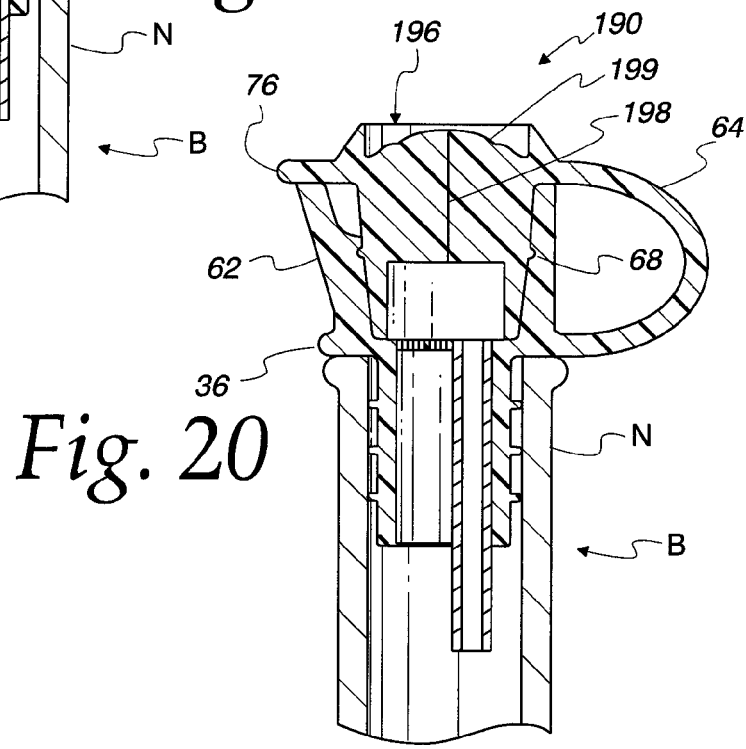
FIG. 20 is a cross-sectional elevation view of another embodiment of a vacuum bottle stopper of the invention.

FIG. 20 illustrates a vacuum stopper 190 which is the same or similar to stopper 30 except that removable cap 196 has a longer valve passageway 198, a much thicker top 199 and no vacuum indicator. The thickness of top 199 is preferably such that top 199 is not hollow at the level of ring 68 providing more compressive force on ring 68 and therefore a better seal. Similarly, thicker top 199 affords a longer passageway 198 with compressive force sealing passageway 198 along its entire length and therefore potentially a better seal.

Operation of Stopper and Methods of Use

Various methods of the invention are described herein. One method of using stopper 30 is to serve wine from a recently opened bottle B through stopper 30. This method includes installing stopper 30 in an open bottle B of wine. Wine is then poured out of bottle B through stopper 30 through wine passageway 46. As wine passes wine passageway 46, filter 50 advantageously filters and aerates wine. Simultaneously and advantageously, air is drawn through air passageway 48 providing a smooth pour. Removable and resealable cap 38 can be inserted into stopper 30 closing wine passageway 46 to reduce aeration of the remaining wine to otherwise protect the wine from flying insects, for example, and to prevent accidental spillage of wine. Cap 38 can be removed later so that additional wine can be poured from the bottle.

Another method of using a stopper of the invention, such as stopper 30, is to use the stopper for storing bottled wine under vacuum. As used herein, "vacuum" means a partial vacuum, not a complete or perfect vacuum. Typically, this method is used on bottled wine that has been opened and partially consumed with the wine that has been consumed being replaced by air. To reduce or prevent deleterious oxidation during storage, stopper 30 is installed in open bottle B and removable cap 38 is inserted into upper portion 54. Valve 40 is opened by inserting tip 154 of hollow needle 152 through valve passageway 104 establishing fluid communication between the interior of bottle B and piston 132 of pump 128 through passageway 140 or through flexible tubing, for example. In some embodiments, opening valve 40 further comprises inserting valve opener 114 through valve opening 102 into valve passageway 104 guided by tapering section 106. Alternatively, valve 40 is opened as follows: pump guide 78 guides the pump, preferably onto pump support 72, which supports the pump during pumping. Preferably valve passageway 104 forms a seal around valve opener 114 comprising hollow needle 152 obviating the need to form a seal elsewhere between stopper 30 and pump 128. The seal around needle 152 is formed due to the expansion of valve passageway 104 by needle 152. Before vacuum is drawn, vacuum indicator 86 is in normal state 94 and vacuum indicator 86 covers marking 160 on opener 114. Once fluid communication is established by valve opener 114, the wine bottle is evacuated by drawing air from bottle B through opener passageway 122 and valve passageway 140 into piston 132 of pump 128 as piston rod 134 moves up. Continued pumping increases the vacuum in bottle B eventually causing indicator 86 to move into vacuum-indicating state 96 revealing marking 160, which signals to the user that sufficient vacuum has been achieved in bottle B for longer-term storage. Indicator 86 may tend to move downwardly incrementally towards vacuum indicator state 96 as the vacuum increases or it may tend to stay in state 94 until a desired storage vacuum is achieved and then move abruptly to state 96, depending on the particular design and materials of construction, for example. Marking 160 may be visible to the user because the pump base 142 is clear or because pump base 142 has a window (not shown).

Once sufficient vacuum is achieved, which is preferably indicated by indicator 86 of stopper 30 or indicator 160 in FIG. 17, pump 128 is disengaged by a user thereby withdrawing the body of valve opener 114 from valve 40 or withdrawing needle 152 from valve 40. Valve passageway 104 closes itself due to compressive forces in the elastomeric material through which valve passageway 104 traverses, to provide a vacuum seal.

Another method of using a stopper in accordance with the invention, such as stopper 30, is to serve wine from a bottle that has been stored under a vacuum within bottle B with stopper 30 in neck N of bottle B. Vacuum in the bottle is released by pushing tab 76 up away from bottle B causing air to enter past spout 62, cap sealing ring 68 and into bottle B. Cap 38 is removed by pushing tab 76 further up and away from bottle B. Wine is then poured out of bottle B through stopper 30 through wine passageway 46. As the wine passes wine passageway 46, filter 50, if present, advantageously filters and aerates the wine. Simultaneously and advantageously, air is drawn through air passageway 48 providing a smooth pour. Removable cap 38 can be inserted into stopper 30 closing wine passageway 46 to reduce aeration of the remaining wine and to prevent accidental spillage of the wine.

The invention has been described with respect to wine bottles and wine, but it is to be understood that the invention can be used on other bottles and for liquids other than wine. Furthermore, while the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A bottle stopper for maintaining a vacuum inside a wine bottle, comprising:
    a bottle stopper having a body composed of a neck portion for insertion into the neck of a wine bottle, the neck portion configured for liquid sealing the neck of the bottle and for maintaining a vacuum inside the bottle, an upper portion extending above the neck portion, and a fluid passageway for pouring wine from the bottle through the neck portion and the upper portion,
    a removable cap comprising a vacuum valve having a self-closing valve passageway that extends to the fluid passageway, the valve passageway adapted to be opened by mechanical insertion of a valve opener into the passageway and the cap adapted to be inserted into the upper portion of the stopper body to form a closed position to form a vacuum-maintaining seal and to close the stopper.

2. The bottle stopper of claim 1 wherein the vacuum valve is an integral part of the cap.

3. The bottle stopper of claim 1 wherein the cap has a cap aperture extending therethrough and the vacuum valve is disposed in the cap aperture.

4. The bottle stopper of claim 3 wherein the cap material surrounding the cap aperture comprises resilient material and the vacuum valve is mounted in the cap aperture in an interference fit relationship to cause the resilient material surrounding the aperture to exert a radial inward force on the vacuum valve body.

5. The bottle stopper of claim 1 wherein the removable cap comprises a brim, extending beyond the upper portion when the cap is inserted into the upper portion of the stopper body to close the stopper.

6. The bottle stopper of claim 5 wherein the bottle stopper further comprises a pour spout in the upper portion of the body and the brim is a tab extending over the pour spout.

7. The bottle stopper of claim 1 wherein the removable cap comprises a vacuum indicator for indicating that a desired vacuum has been achieved in the bottle wherein the stopper is in an operative position inside the bottle.

8. The bottle stopper of claim 7 wherein the vacuum valve is located in a top portion of the cap and the vacuum indicator comprises a flexible region in the top of the cap that circumscribes a region including the vacuum valve opening and permits the circumscribed region to be deflected relatively inwardly towards the neck portion when the stopper is mounted on a bottle and there is a vacuum in the bottle, and the circumscribed region is not relatively deflected inwardly in the absence of a vacuum in the bottle.

9. The bottle stopper of claim 7 wherein the vacuum indicator comprises a relatively thinner portion in the top of the cap.

10. A vacuum bottle stopper kit comprising the bottle stopper of claim 1 and a vacuum pump having a mechanical insertion member for opening the vacuum valve, the vacuum valve for evacuating the interior of a wine bottle through the valve passageway when the bottle stopper is mounted in the wine bottle.

11. The bottle stopper kit of claim 10 wherein the bottle stopper further comprises a vacuum indicator in the cap and wherein the vacuum valve is located in a top portion of the cap and the vacuum indicator comprises a flexible region in the top of the cap that circumscribes a region including the vacuum valve opening and permits the circumscribed region to be deflected relatively inwardly towards the neck portion when the stopper is mounted on a bottle and there is a vacuum in the bottle, and the circumscribed region is not relatively deflected inwardly in the absence of a vacuum in the bottle, wherein the mechanical insertion member comprises a hollow needle having a marking, the needle insertable into the valve passageway, the marking being disposed within the valve passageway in the absence of a vacuum in the bottle, the vacuum indicator being movable relative to the hollow needle so that the marking is revealed by movement of the vacuum indicator in the cap inwardly and relative to the hollow needle in response to the vacuum pump forming a vacuum in the bottle.

12. A method of evacuating and storing wine in a wine bottle having an opening comprising:
    providing a bottle stopper comprising a bottle stopper having a body composed of a neck portion for insertion into the neck of a wine bottle, the neck portion configured for liquid sealing the neck of the bottle and for maintaining a vacuum inside the bottle, an upper portion extending above the neck portion, and a fluid passageway for pouring wine from the bottle through the neck portion and the upper portion, a removable cap comprising a vacuum valve having a self-closing valve passageway that extends to the fluid passageway, the valve passageway adapted to be opened by mechanical insertion of a valve opener into the passageway and the cap adapted to be inserted into the upper portion of the stopper body to form a closed position to form a vacuum-maintaining seal and to close the stopper, the method comprising:

installing the stopper into the opening of the wine bottle;

if the cap is not in the closed position, placing the cap in the closed position;

opening the valve passageway by mechanically inserting a valve opener into the valve passageway; and evacuating the wine bottle to form a vacuum therein by withdrawing air from the interior of the bottle through the valve passageway.

13. The method of claim 12 wherein evacuating the wine bottle further comprises drawing air from the wine bottle through the valve opener.

14. The method of claim 12 wherein the stopper further comprises a pump support and wherein opening the valve passageway further comprises guiding the pump onto the pump support such that the valve opener enters the valve passageway.

15. The method of claim 12 wherein the stopper further comprises a vacuum indicator in the removable cap, the method further comprising depressing the vacuum indicator by evacuating the bottle.

16. The method of claim 15 wherein depressing the vacuum indicator reveals a sufficient vacuum marking on the valve opener.

17. The method of claim 12 wherein placing the cap in the closed position comprises seating the removable cap into the upper portion.

18. The method of claim 12 further comprising storing the wine in the bottle with a vacuum therein for an extended period of time of at least one day.

19. A method of serving wine from a wine bottle having a vacuum in the interior thereof and having a bottle stopper in the neck, the stopper comprising a body composed of a neck portion for insertion into the neck of a wine bottle, the neck portion configured for liquid sealing the neck of the bottle and for maintaining a vacuum inside the bottle, an upper portion extending above the neck portion, and a fluid passageway for pouring wine from the bottle through the neck portion and the upper portion, a removable cap comprising a vacuum valve having a self-closing valve passageway that extends to the fluid passageway, the valve passageway adapted to be opened by mechanical insertion of a valve opener into the passageway and the cap adapted to be inserted into the upper portion of the stopper body to form a closed position to form a vacuum-maintaining seal and to close the stopper, the method comprising at least partially removing the removable cap from the upper portion of the bottle stopper to allow air from the atmosphere to enter the interior of the bottle.

20. The method of claim 19 further comprising opening the bottle stopper by completely removing the cap from the upper portion of the bottle stopper and pouring wine from the bottle through the body of the bottle stopper through the upper portion.

21. The method of claim 19 further comprising:

thereafter, with wine remaining in the bottle, evacuating the wine bottle to form a vacuum therein by withdrawing air from the interior of the bottle through the valve passageway; and storing for a period of time the wine remaining in the bottle while under vacuum.

* * * * *